Feb. 21, 1933.   E. C. NEWCOMB   1,898,888
BRAKE
Filed Sept. 29, 1927   2 Sheets-Sheet 1
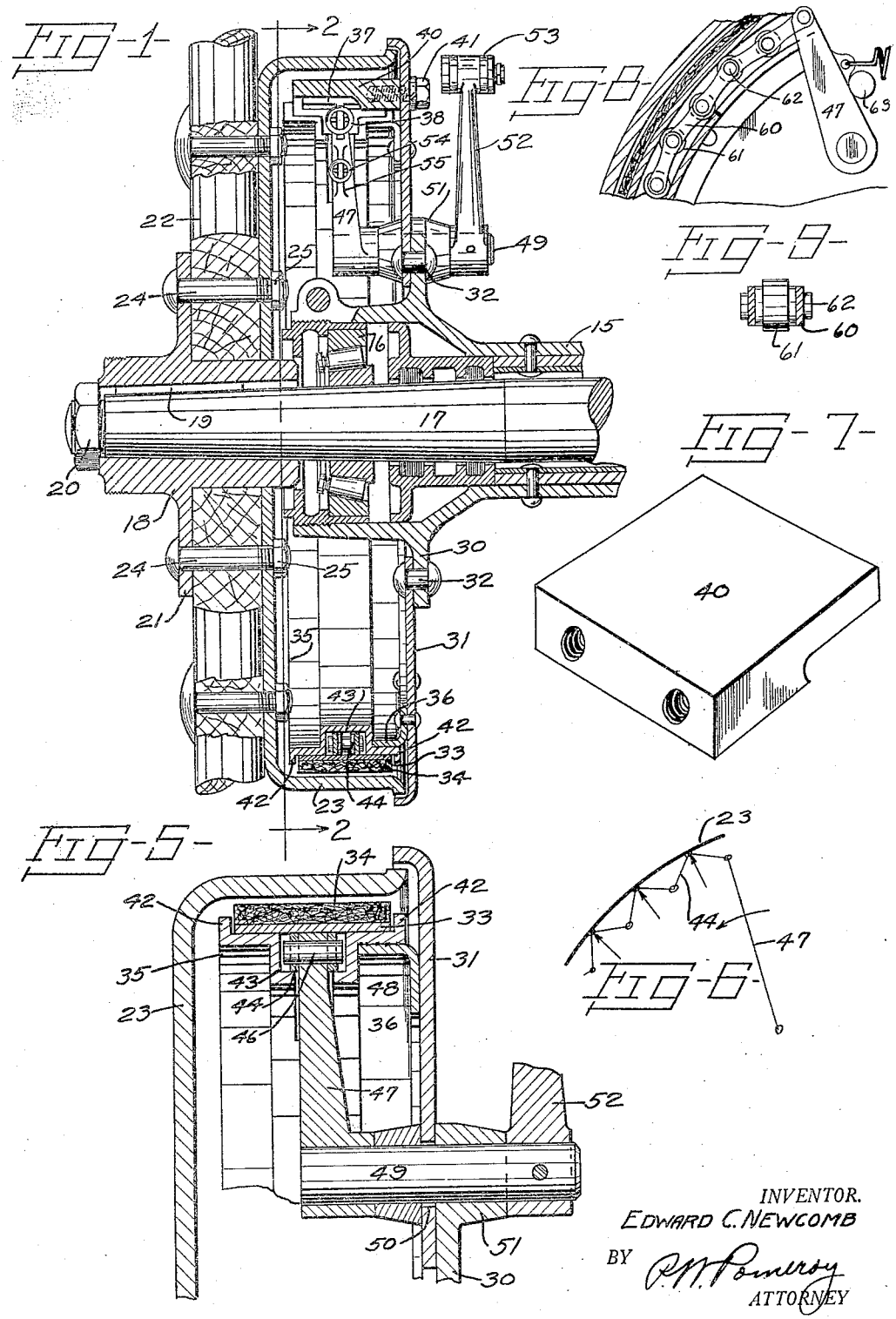
INVENTOR.
EDWARD C. NEWCOMB
BY
ATTORNEY Feb. 21, 1933.  E. C. NEWCOMB  1,898,888
BRAKE
Filed Sept. 29, 1927  2 Sheets-Sheet 2
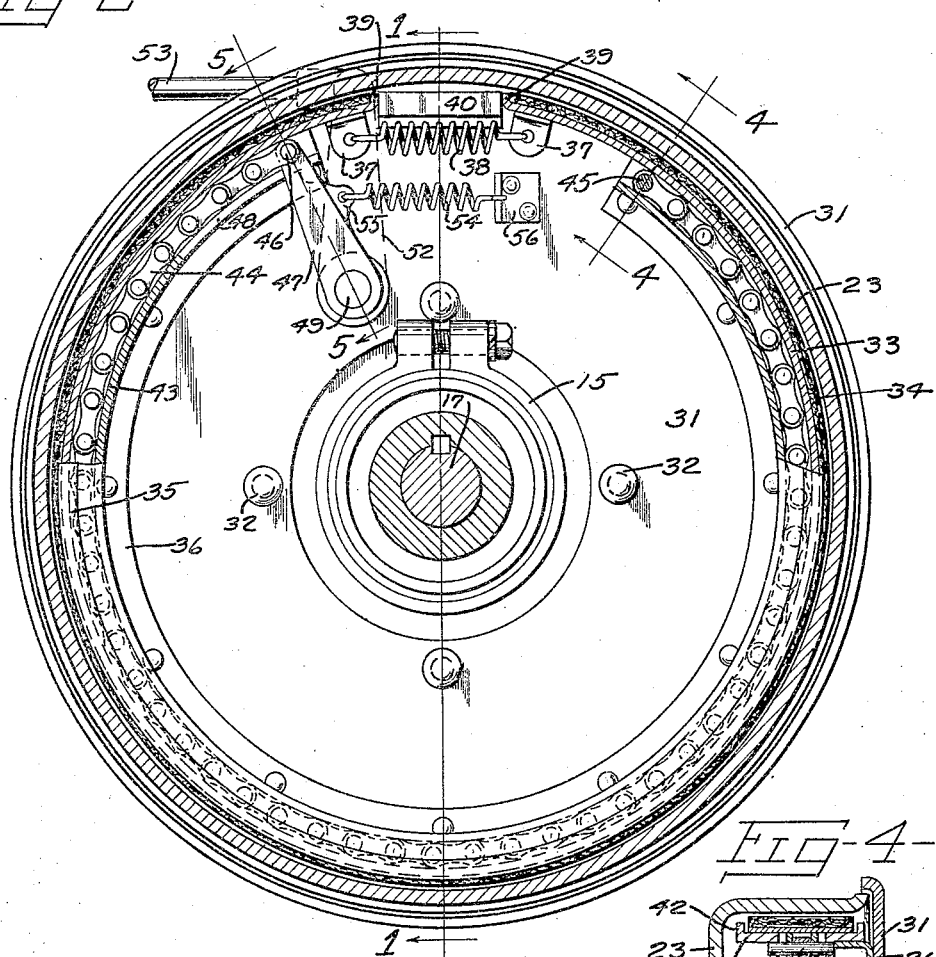
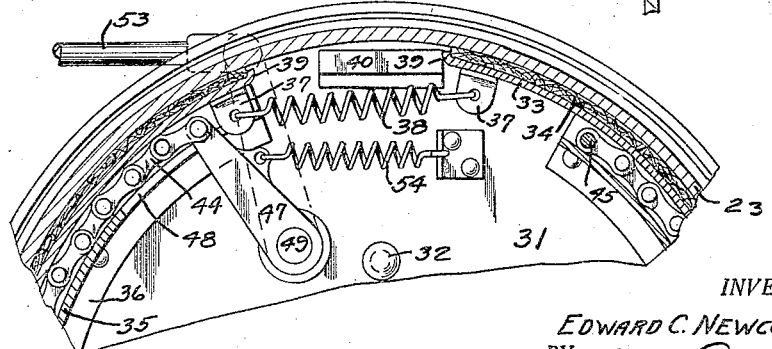
INVENTOR.
EDWARD C. NEWCOMB
BY
ATTORNEY Patented Feb. 21, 1933

1,898,888

UNITED STATES PATENT OFFICE

EDWARD C. NEWCOMB, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed September 29, 1927. Serial No. 222,791.

This invention relates to vehicle brakes and particularly to a new and novel means for operating the same, the principal object being to provide a vehicle brake with an operating means in which pressure is applied to the brake element in a plurality of radial directions to engage the same with the brake drum.

Another object is to provide a vehicle brake with a flexible brake element and with means for exerting a plurality of pressures in a radial direction against the same to engage the brake drum.

Another object is to provide a vehicle brake with a flexible brake element, a pivoted link chain contacting therewith, and means for moving the chain to exert a plurality of pressures against the brake element radially of the brake drum to engage the same with the brake drum.

A further object is to provide a vehicle brake with a flexible band, a pivoted link chain anchored at one end contacting with the inner periphery of the band, a guiding support for the chain and means for moving the chain to exert a plurality of radial forces against the band to frictionally engage the same with the brake drum.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a transverse section taken on the line 1—1 of Figure 2, showing the left wheel of a motor vehicle rear axle provided with a brake of the present invention.

Figure 2 is a section of the brake taken on the line 2—2 of Figure 1, clearly showing the brake operating mechanism in normal, inoperative position.

Figure 3 is a fragmentary section similar to Figure 2, showing the brake in operative position.

Figure 4 is a section taken on the line 4—4 of Figure 2.

Figure 5 is an enlarged section taken on the line 5—5 of Figure 2.

Figure 6 is a diagrammatical view showing the chain links in an exaggerated position.

Figure 7 is an enlarged perspective view of the brake band stop member.

Figure 8 is a fragmentary section showing the brake in inoperative position, using a modified form of operating chain.

Figure 9 is a transverse section taken thru the modified form of band operating chain shown in Figure 8.

Referring to the accompanying drawings, in which like numerals refer to like parts throughout the several views, the rear axle housing 15 is enlarged at each end to receive a bearing 16, which rotatably supports the outer end of a rear axle shaft 17. The rear axle shaft 17 is positioned within the housing 15 and projects beyond the edge thereof to receive a wheel hub 18 which is held against rotation by means of a key 19. A nut 20 threaded on the end of the shaft 17, prevents longitudinal movement of the hub 18 relative to the shaft 17. The hub 18 is formed with a flange 21, to which a wheel 22 and a brake drum 23 are concentrically secured by means of bolts 24, having nuts 25 threaded thereon. The enlarged end of the rear axle housing 15 is provided with a circumferential flange 30, to which a dust cover or backing plate 31 is secured by rivets 32. The backing plate 31 is concentric with and is positioned as close to the brake drum 23 as possible to exclude dirt and foreign particles from the brake mechanism.

As shown in Figures 2 and 5, a brake band 33 of preferably flexible thin gauge spring steel covered with a suitable friction facing 34, is arranged concentrically within the drum 23 to surround a split circular channel-shaped support 35, which is supported by and welded to a split L sectioned ring 36 attached to the backing plate 31. T shaped brackets 37 are secured to the band 33 adjacent the ends thereof to receive the ends of a coil spring 38 which normally draws the ends of the band 33 toward each other and out of engagement with the drum 23. The band 33 is normally wrapped around the supporting channel 35, and its ends which are flanged outwardly to provide abutment faces 39, engage the sides of a stop block 40 secured by cap screws 41 to the dust plate 31. The side flanges 42 of the supporting channel 35 act as guides for the brake band 33, and prevent transverse movement of the same relative to the brake drum 23.

Formed midway between the sides 42 of the supporting channel 35, is a rectangular trough 43 which receives a pivoted link chain 44, which may be similar to a bicycle chain although many other forms of chain can be substituted. The chain 44 as shown in Figure 4 is pivoted at one end on a pin 45 extending through the side walls of the trough 43 formed in the supporting channel 35. The other end of the chain 44, as seen in Figures 2 and 5, is pivoted on a pin 46 secured to the end of a rotatable arm 47 which extends upwardly through a slot 48 formed at one end in the bottom of the trough portion 43. The arm 47 is mounted on the end of a rotatable shaft 49 which extends through an opening 50 in the backing plate 31, and is journaled in a bearing 51 formed of a portion of the metal comprising the axle housing flange 30.

A lever pinned to the end of the shaft 49 is pivoted to an end of a brake rod 53 connected with some source of braking pressure such as a conventional foot pedal or hand lever, (not shown). A coil spring 54 secured at one end to a boss 55 formed on the chain operating lever 47 and secured at the other end to a bracket 56 attached to the backing plate 31, normally pulls the lever 47 in a clock-wise direction to wrap the chain 44 around the bottom of the trough 43 when the brake is in inoperative position as shown in Figure 2.

The brake band 33 is moved into engagement with the brake drum 23 by moving the lever 52 in a counter-clock-wise direction as viewed in Figure 2, which causes the arm 47 to move in the slot 48 and slide the free end of the chain 44. As one end of the chain 44 is anchored, each chain link pivots about one end and assumes an angular position relative to its adjacent link as shown in Figures 3 and 6, Figure 6 being a diagrammatical view of the brake band 33 and chain 44, which shows the chain links in an exaggerated angular position relative to each other. One end of each link contacts with the bottom of the housing trough 43 and the other end thereof, contacts with and exerts pressure against the band 33. As substantially all of the chain links act in this manner, it is evident that a plurality of pressures acting substantially in a radial direction are exerted along the entire circumferential length of the band 33 and the same is caused to expand outwardly to evenly engage the brake drum 23. During the expansion of the band 33, one of its abutment faces 39 at one end engages the adjacent side wall of the stop block 40, and the other end thereof, is moved outwardly, the end of the band 33 abutting against the stop block 40 being dependent upon the direction of rotation of the brake drum 23. As soon as the pressure in the lever 52 is released the coil spring 54 retracts the lever 43 to return the chain 44 to normal inoperative position and the coil spring 38 draws the ends of the band 33 toward each other to disengage the band from the brake drum 23.

In Figure 8, a modification of the brake mechanism is shown to incorporate a different form of chain 60. The chain 60, a cross section of which is shown in Figure 9, is provided with rollers 61 rotatably mounted on each chain pivot pin 62. Figure 8 shows the brake in inoperative position with the chain links thereof, angularly positioned relative to each other and normally held in this position by a stop pin 63, against which the chain operating lever 47 abuts. By normally positioning the chain 60 in this manner, positive action of the ends of the links contacting with the band 33 is assured and there is no possibility of some of the links not exerting a pressure against the band 33. The roller 61 permits easier action of the brake mechanism as each one of the same rolls upon the brake band surface and reduces the friction therebetween to a minimum.

From the foregoing description, it is apparent an entirely new type of brake mechanism is provided which allows the full benefit of an internal wrapping band to be realized. It is also apparent that a more flexible and therefore, a more efficient band can be used and that the same can be expanded to engage the brake drum more evenly by exerting a plurality of pressures against the same radially of the brake drum.

It is to be understood that the present invention is not limited to the constructions shown and that formal changes may be made in the specific embodiment of the invention described without departing from the spirit and substance of the broad invention, the scope of which is commensurate with the appended claims.

What I claim is:

1. In a brake mechanism, a rotatable drum, a backing plate adjacent thereto, a brake element engageable with said drum, means movable to exert a plurality of radial forces against said brake element to engage said brake element with said drum, a circular support on said backing plate for said means also normally supporting said brake element, and means for moving said first mentioned means circumferentially of said support.

2. In a brake mechanism, a rotatable drum, a backing plate adjacent thereto, a brake element engageable with said drum, means normally holding said brake element out of engagement with said drum, a circular member on said backing plate normally supporting said brake element, and pivotally connected members carried by said circular member for exerting a plurality of pressures in a radial direction against said brake element to engage said element with said rotatable drum.

3. In a brake mechanism, a rotatable drum, a brake element engageable therewith, a spring normally holding said element out of engagement with said drum, a split circular member normally supporting said brake element, pivotally connected members positioned between said brake element and said circular member movable to exert a plurality of pressures in a radial direction against said brake element to engage the same with said brake drum, and means for moving said pivotally connected members circumferentially of said circular member.

4. In a brake mechanism, a rotatable drum, a free-floating brake element engageable therewith, a spring normally holding said element out of engagement with said drum, a split circular support normally supporting said brake element, means contacting with said brake element carried by said support movable to exert a plurality of pressures in a radial direction against said brake element to frictionally engage the same with said brake drum, and a lever for moving said first mentioned means to move said brake element into engagement with said drum.

5. In a brake mechanism, a rotatable drum, a band expandible to engage said drum, a chain comprising a plurality of longitudinally symmetrical links for expanding said band, and means for changing the relative position of the chain links relative to said band to exert a plurality of radial forces around the inner periphery of said band.

6. In a brake mechanism, a rotatable drum, braking means engageable therewith, means normally holding said braking means out of engagement with said drum, a chain comprising a plurality of longitudinally symmetrical links movable relative to said braking means for moving the same into engagement with said drum, said chain being free at one end and anchored at the other end, and means for applying pressure against the free end of said chain.

7. In a brake mechanism, a rotatable drum, a split circular flexible band expandible to engage said drum, a band expanding means movable relative to said band comprising a chain formed of longitudinally symmetrical links free at one end and anchored at the other end, and a lever connected with said free end exerting pressure thereagainst for changing the angular relationship between the links of said chain to apply a plurality of forces to said band radially of said drum for expanding said band into engagement with said drum.

8. In a brake mechanism, a rotatable drum, braking means expandible to engage said drum, a spring normally holding said braking means out of engagement with said drum, a chain formed of longitudinally symmetrical links movable relative to said braking means to expand the same to engage said drum, said chain being free at one end and anchored at the other end, an actuating lever connected with said free end of said chain for exerting pressure thereagainst to expand said braking means, and means for holding said lever and said chain in normal inoperative position.

9. In a brake mechanism, a rotatable drum, a split circular band engageable therewith, a stop interposed between the ends of said band, a spring normally holding the ends of said band against said stop out of engagement with said drum, a chain comprising longitudinally symmetrical links engageable with substantially the entire circumferential length of said band for moving said band into engagement with said drum, a lever connected with an end of said chain for moving the same to engage said band with said drum, and a spring for holding said lever and chain in normal inoperative position.

10. In a brake mechanism, a rotatable drum, a flexible free-floating band expandible to engage the inner surface of said drum, a chain formed of longitudinally symmetrical links engageable with the inner circumference of said band and movable thereon for expanding said bands to engage said drum, and means for moving said chain.

11. In a brake mechanism, a rotatable drum, a flexible free-floating band expandible to engage the inner surface of said drum, a circular support normally supporting said band, a pivoted link chain engageible to engage the inner surface of said band carried by said support, and means for moving said chain between said band and said support for applying a plurality of pressures in a radial direction against said band to expand the same into engagement with said drum.

12. In a brake mechanism, a rotatable drum, a split flexible free-floating band expandible to engage said drum, a circular support normally supporting said band, a pivoted link chain anchored at one end positioned between said band and support, said chain being of substantially the same length as said band, and means connected with the free end of said chain for moving the same to expand said band into engagement with said drum.

13. In a brake mechanism, a rotatable drum, a split flexible free-floating band expandible to engage said drum, a split circular support normally supporting said band, a pivoted link chain anchored at one end positioned between said band and support, a pivoted lever connected to the free end of said chain, means normally holding said chain in inoperative position, and means for moving said lever whereby the links of said chain are moved to angular positions relative to each other for exerting a plurality of pressures against said band to expand the same into engagement with said drum.

14. In a brake mechanism having a rotatable drum and a flexible band engageable therewith, a circular channel-shaped support normally supporting said band, the sides of said support forming a guide for said band to prevent transverse movement of the same relative to said drum, a chain positioned between said band and support, and means for operating said chain to move said band to engage said drum.

15. In a brake mechanism having a rotatable drum and a flexible band engageable therewith, a circular support normally supporting said band, a circumferential trough in the base of said support, a pivoted link chain in said trough engaging said band, and means for moving said chain in said trough whereby the links of said chain assume angular positions relative to each other to exert a plurality of pressures against said band to expand the same into engagement with said drum.

16. In a brake mechanism having a rotatable drum and a free-floating flexible band engageable therewith, a circular channel-shaped support for said band, the side walls thereof preventing transverse movement of said band relative to said drum, a circumferential trough in the base of said support, a pivoted link chain movable in said trough to engage said band, said chain being free at one end and anchored at the other end, and a lever connected to the free end of said chain for moving said chain circumferentially of said trough to angularly position the links thereof relative to each other for exerting a plurality of forces against said band to expand the same into engagement with said drum.

17. In a brake mechanism having a rotatable drum and a free-floating band expandible to engage said drum, a circular support for said band, a circumferential trough in the base of said band, a pivoted link chain movable in said trough, a pin extending through the walls of said trough to anchor one end of said chain, and a lever connected to the free end of said chain to move the same circumferentially in said trough to expand said band into engagement with said drum.

18. In a brake mechanism having a rotatable drum and a split circular band expandible to engage said drum, a pivoted link chain movable to expand said band into engagement with said drum, a pivoted lever connected with an end of said chain to move the same, and a circular support for said band provided with a trough to house said chain, the bottom of said trough adjacent said lever being slotted to permit movement thereof.

19. In a brake mechanism, a rotatable drum, braking means extending substantially the entire circumference of said drum engageable therewith, pivotally connected actuating members for said braking means extending substantially the entire circumferential length thereof, supporting means for said actuating members extending substantially the full circumferential length of said braking means, and actuating means for actuating said braking means and actuating members.

20. In a brake mechanism, a rotatable drum, a backing plate for said drum, braking means engageable with said drum, a support for said braking means extending substantially the full circumferential length thereof secured to said backing plate, and pivotally connected actuating members for said braking means positioned between said braking means and support carried by said support.

21. In a brake mechanism, a rotatable drum, a backing plate for said drum, braking means expandible to engage said drum, a support for said braking means extending substantially the full circumferential length thereof secured to said backing plate, and pivotally connected links carried by said support extending substantially the entire circumferential length of said braking means for expanding the same into contact with said drum.

22. In a brake mechanism, a rotatable drum, braking means adapted to engage the inner surface thereof, a support spaced from and arranged concentrically with said drum, operating means for said braking means anchored at one end positioned between said support and said braking means, and means connected with the free end of said operating means for moving said braking means into engagement with said drum.

23. In a brake mechanism, a rotatable drum, braking means adapted to engage said drum, a support for said braking means spaced from and arranged concentrically with said drum, a plurality of links pivotally connected at their ends positioned between said support and braking means, one of said links being anchored against longitudinal movement, and means connected with one of the unanchored links for moving said braking means into engagement with said drum.

24. In a brake mechanism, a rotatable drum, a backing plate for said drum, free floating braking means having spaced ends adapted to engage said drum, a stop mounted on said backing plate between the spaced ends of said braking means to limit circumferential movement thereof relative to said drum, a support arranged concentrically with said drum mounted on said backing plate, a plurality of pivotally connected links having an end link anchored on said backing plate positioned between said support and braking means, and means engageable with an unanchored link for moving said braking means into engagement with said drum to retard rotation thereof.

25. In a brake mechanism, a rotatable drum, free floating braking means engageable therewith, a pivoted link chain anchored at one end adapted to exert a plurality of forces in a radial direction on said braking means to engage the same with said drum, means for moving said chain into operative engagement with said braking means, means to move said chain out of operative engagement with said braking means, and means engageable with said second named means to limit the movement of said chain in the direction toward inoperative engagement with said braking means.

26. In a brake mechanism, a rotatable drum, free floating braking means having spaced ends engageable therewith, a stop between the spaced ends of said braking means to limit circumferential movement of said braking means, means normally holding said free ends in contact with said stop and out of engagement with said drum, a pivoted link chain anchored at one end adapted to exert a plurality of forces in a radial direction on said braking means to engage the same with said drum, means for moving said chain into operative engagement with said braking means, a spring to move said chain out of operative engagement with said braking means, and a stop to limit the movement of said chain in the direction toward inoperative engagement with said braking means.

27. In a brake mechanism, a rotatable drum, braking means engageable therewith, and a chain having a plurality of symmetrical links movable by pressure against the ends of the links thereof whereby said links tend to move in a radial direction to exert a plurality of forces on said braking means to thereby engage said braking means with said drum.

28. In a brake mechanism, a rotatable drum, braking means engageable therewith, a chain having a plurality of pivoted symmetrical links movably engageable with said braking means, and means exerting pressure against said links tending to move the same radially relative to said drum to exert a plurality of forces on said braking means to engage the same with said drum.

Signed by me at South Bend, Indiana this 27th day of September, 1927.

EDWARD C. NEWCOMB.

CERTIFICATE OF CORRECTION.

Patent No. 1,898,888.   February 21, 1933.

EDWARD C. NEWCOMB.

It is hereby certified that error appears in the printed specification of the above numbered patent requiring correction as follows: Page 3, line 120, claim 11, strike out the syllable and words "ible to engage the inner surface" and insert instead "able with the inner circumference"; and that the said Letters Patent should be read with this correction therein that the same may conform to the record of the case in the Patent Office.

Signed and sealed this 28th day of March, A. D. 1933.

M. J. Moore,
Acting Commissioner of Patents.

(Seal)